United States Patent [19]

Meyer

[11] Patent Number: 4,746,367

[45] Date of Patent: May 24, 1988

[54] SUPERPLASTICIZER COMPOSITION FOR USE WITH HYDRAULIC CEMENTS

[75] Inventor: Wilfred C. Meyer, Midland, Mich.

[73] Assignee: The Dow Chemical Company, Midland, Mich.

[21] Appl. No.: 943,296

[22] Filed: Dec. 17, 1986

[51] Int. Cl.$^4$ .................. C04B 24/28; C04B 24/04; C04B 24/06
[52] U.S. Cl. ........................................ 106/314; 106/90
[58] Field of Search .................................. 106/314, 90

[56] References Cited

U.S. PATENT DOCUMENTS

| | | | |
|---|---|---|---|
| 2,640,820 | 6/1953 | Teot et al. | 260/79.3 |
| 2,648,645 | 8/1953 | Boris et al. | 106/90 |
| 3,351,478 | 11/1967 | Dodson et al. | 106/90 |
| 3,686,133 | 8/1972 | Hattori et al. | 106/90 |
| 4,071,493 | 1/1978 | Begou | 260/42.13 |
| 4,076,699 | 2/1978 | Grimaud et al. | 106/90 |
| 4,164,426 | 8/1979 | Sinka et al. | 106/90 |
| 4,647,632 | 3/1987 | Priddy | 526/88 |
| 4,704,415 | 11/1983 | Pierce et al. | 524/8 |

FOREIGN PATENT DOCUMENTS 1480775 7/1977 United Kingdom .
1575450 9/1980 United Kingdom .
1588130 4/1981 United Kingdom .

OTHER PUBLICATIONS

R. M. Edmeades et al., "Superplasticized Concrete-High Workability Retention", Proceedings of Admixtures Congress, CI 80, Lancaster, Construction Press, 1980.

V. S. Ramachandran, "Effect of Retarders/Water Reducers on Slump Loss in Superplasticized Concrete", American Concrete Inst., SP-68, 1981, pp. 393-407.

Encyclopedia of Polymer Science & Tech. Interscience (1965), vol. 13, pp. 190-200.

Primary Examiner—William R. Dixon, Jr.
Assistant Examiner—David M. Brunsman
Attorney, Agent, or Firm—A. Cooper Ancona

[57] ABSTRACT

An improved superplasticizer comprising the combination of a sulfonated copolymer of styrene and alpha-methylstyrene together with a minor amount of a salt of gluconic acid.

15 Claims, No Drawings

SUPERPLASTICIZER COMPOSITION FOR USE WITH HYDRAULIC CEMENTS

BACKGROUND OF THE INVENTION

Several classes of hydraulic cements are known, such as Portland cement, high-alumina cement, and gypsum which are categorized by their chemical composition and use. For example, Portland cement is commonly used in structural applications and is high in silicate content. In this disclosure the term "cement" shall refer to silicate cement compositions including Portland cement, pozzolanic cements, hydraulic limes, fly ash and natural cements. Cements are used in concrete, grouting and mortar compositions which contain other components such as sand and gravel, or stone.

Cement compositions are rendered useful by the combination of the solid components with water. To obtain a mixture with sufficient workability in order to pour into a mold or form, an amount of water in excess of that required for hydration of the cement components is necessary. During the hardening of the composition, the excess water remains and ultimately, as it evaporates, causes cavities to be formed in the hardened molded structure. These cavities reduce the integrity of the structure and result in a compressive strength which is lower than that theoretically obtainable. It is, therefore, desirable to use the lowest amount of water possible in a cement composition in order to obtain the best compressive strength. Since low amounts of water, while desired for strength, make workability difficult, a compromise is called for.

Additives which cause the strengthening of cement compositions by water reduction while allowing the mixtures to have adequate workability are commonly called water reducers or plasticizers. Those which allow high levels of water reduction are known as high range water reducers or superplasticizers. These superplasticizers act as cement dispersing agents to increase the fluidity of the mix such that less water will produce the same workability, or slump, as a control containing 20% more water.

Advantages of these superplasticizers include (1) the production of higher strength concrete since a lower water/cement ratio is used, and/or (2) easier placement of concrete with more uniform properties because of its improved workability, and (3) a concrete mix of the same workability and strength using less cement in the mix. Lignin sulfonates and sugars are common plasticizers while typical commercial superplasticizers are sulfonated melamine-formaldehyde condensates or sulfonated naphthalene-formaldehyde condensates. In addition, sulfonates of styrene polymers have been described as fluidizing agents for cement compositions.

U.S. Pat. No. 4,164,426 teaches the use of zinc naphthalene-formaldehyde sulfonate in concrete mixes for improved compressive strength. The patented material claimed functions as a superplasticizer but with the added advantage of producing higher strength concrete than normally obtainable, e.g. with the sodium salt of naphthalene-formaldehyde sulfonate.

U.S. Pat. No. 4,071,493 describes alkali metal salts of sulfonated styrene-indene hydrocarbon resins as fluidizing agents for mineral binders.

British Pat. No. 1,588,130 describes a hydraulic cement composition which includes a plasticizer comprising a sulfonated polystyrene. It is taught that the sulfonate is preferably used in the salt form. The inclusion of a water soluble carbonate in the composition apparently improves the plasticizing effect of the sulfonated polystyrene although the sulfonated polystyrene may be used with or without the carbonate.

U.S. Pat. No. 4,076,699 describes a process for the preparation and use of alkali salts of a sulfonated styrene polymer or copolymer as fluidizing agents for mineral binders. The materials exemplified in the patent are salts of sulfonated polystyrene and sulfonated polyvinyltoluene. No examples of copolymers are given.

The period of workability of hydraulic cement mixes containing superplasticizers is considerably shorter than that of normal mixes, generally 30-60 minutes or less before stiffening jeopardizes its proper placement at the worksite. Three methods have been proposed to solve this slump loss (loss of workability with time) problem: (1) delayed addition of superplasticizer at the site in the ready mix truck; (2) repeated doses of superplasticizer to refluidize the mix; (3) addition of a retarder, e.g., a hydroxycarboxylic acid salt. The first two approaches pose difficulties in practice because of variability of temperature, cement type, and content, mixing criteria, etc. The use of retarding admixtures shows some variation in performance. One reference states that sodium heptonate retarder with naphthalene-formaldehyde condensates gives lower loss of workability than with either alone (Edmeades, R. M. and Hewlett, P. C., "Superplasticised Concrete—High Workability Retention," *Proceedings of Admixtures Congress*, CI 80, Lancaster, Construction Press, 1980, pp. 49–72). Another reference discloses that sodium heptonate with sulfonated melamine-formaldehyde condensates increase initial slump only slightly with a slightly higher slump after two hours compared to a concrete containing the melamine-based superplasticizer alone (Ramachandran, V. S., "Effect of Retarders/Water Reducers on Slump Loss in Superplasticized Concrete", in *Developments in the Use of Superplasticizers*, American Concrete Institute, SP-68, 1981, pp. 393–407). Finally, sodium gluconate influences slump loss the most, although, at the level disclosed in the above reference, both initial setting times and early compressive strength of mortar were retarded. The suggestion that lower dosages of gluconate would overcome slow setting and low early strengths, possibly with the use of accelerators, is not demonstrated.

A patent (U.S. Pat. No. 3,686,133), earlier than the Edmeades and Hewlitt reference above, discloses the use of a dispersing agent for hydraulic cement which is a combination of a salt of a naphthalene sulfonic acid-formaldehyde condensation product and a salt of gluconic acid. Better flow properties and enhanced strength are said to result.

In another patent (British Pat. No. 1,575,450) a cement composition employs a sodium salt of gluconic acid as a set retarder when used in combination with an α-hydroxycarbonyl accelerator compound and a carbonate of sodium.

It is the object of this invention to improve both compressive strength of mortars and concretes and lessen slump loss, using known retarders, e.g. gluconic acid salts. Heretofore the gluconic acid salts were not able to influence slump loss without also retarding initial setting times and/or reducing early compressive strength.

It has now been discovered that low levels of gluconate salts when added to concrete mixes in which the sulfonated copolymers of styrene-α-methyl styrene are dispersed, provide improved and extended workability properties to the mix, along with improved compressive strength properties of the cured concrete.

SUMMARY OF THE INVENTION

The composition of the present invention is the combination of a sulfonated styrene-α-methylstyrene copolymer, or salt thereof, with a minor amount of a salt of gluconic acid. The salts of the copolymer and of the gluconic acid may be ammonium, alkali metal or amine salts. The composition lessens slump loss without retarding initial setting times or reducing early compressive strength.

DETAILED DESCRIPTION OF THE INVENTION

Use of retarders in superplasticized concrete has traditionally been used at levels where both early strength and initial set were retarded. The ability to control loss of workability with superplasticizers has rested on on-site addition of the dispersant, or multiple addition of superplasticizer to repeatedly reduce stiffness of the mix, or addition of a retarder in such quantity as to reduce slump loss while the retarding properties were also manifested. A combination has now been shown which provides both improved early strength and extended workability. The following examples illustrate such combinations.

The sulfonated styrene-α-methylstyrene copolymer is the superplasticizer employed herein. The copolymer contains mole ratios of from 90:10 to 10:90, preferably 30:70 to 70:30, of styrene to α-methylstyrene. The weight average molecular weight of these copolymers preferably may vary from 2,000 to 20,000 although molecular weights up to 100,000 are satisfactory. Methods of preparing the copolymers are known to the art, e.g. *Encyclopedia of Polymer Science and Technology, Interscience*, (1965), Vol. 13, pp. 156–200. The copolymers are then sulfonated by known methods.

If the copolymer is prepared in a solvent compatible with the sulfonation reaction, the sulfonation can follow such preparation without separating the polymer from the solvent. Excess monomer, however, can interfere and produce undesired coproducts. It is preferred to remove the monomer and sulfonate the copolymer separately to obtain a purer sulfonated product. The sulfonation process described in U.S. Pat. No. 2,640,820 is satisfactory to produce the sulfonated copolymers of the invention.

The sulfonated copolymer used in the superplasticizer composition of the present invention may have a degree of sulfonation of from about 0.5 to about 2.0. A preferred range is from about 1.0 to about 1.5. The degree of sulfonation is defined as the number of moles of $SO_3$ per mole of phenyl ring functionality in the copolymer.

A more detailed description and examples of making and sulfonating the copolymer can be found in a co-pending application of another inventor, Ser. No. 873,900 titled "High Efficiency Superplasticizer for Cement Compositions", filed June 13, 1986 now U.S. Pat. No. 4,704,415.

The sulfonated styrene-α-methylstyrene copolymers of the invention are added to the cement slurry in an amount of from about 0.05 to about 2.0 percent by weight based on the weight of the dry cement. The preferred range is from about 0.1 to about 0.5 percent by weight.

The sulfonated copolymers may be used in the form of the ammonium, alkali metal or amine salts. Thus, lithium, potassium or sodium salts are useful as are amine salts derived from aminoethylpiperazine, diethylamine, triethylamine, n-butylamine, ethylenediamine, diethylenetriamine, triethylenetetraamine and tetraethylenepentamine and the like.

The amount of gluconate salt is added to the cement slurry in an amount of from about 0.1 to about 0.1 percent by weight based on the dry cement. The preferred range is from about 0.02 to about 0.05 percent based on the cement.

The salts of gluconic acid useful in the invention are alkali and alkaline earth metal salts thereof. Thus, lithium, sodium, potassium, calcium and barium salts of gluconic acid are useful in the practice of the invention.

In the following examples, a 1½ cubic foot drum mixer was used with 30 pounds Portland Cement (Type I, non-air entraining), 80 pounds Michigan 2NS sand ("NS" is a designation for natural sand which satisfies ASTM C-33), and 80 pounds of limestone gravel which contains equal amounts of size fractions ¼-⅜ inch, ⅜-½ inch, ½-¾ inch, and ¾-1 inch. These ingredients were dry-blended for 30 seconds followed by addition of mix water (16 pounds for a control containing no superplasticizer or superplasticizer admixture and 12 pounds of water when a water-reducing admixture was used). An admixture was added after the initial water and dry ingredients had been mixed one minute; the admixture components were introduced into the mix in 0.8 pounds of water so that the total water/cement (w/c) ratio was reduced by 20% from that of the control. Thus the control contained a w/c ratio of 0.53 and the superplasticizer mixes contained a w/c ratio of 0.43. The mixing sequence followed the schedule of three minutes mix, two minutes rest, three minutes mix from the point of addition of initial mix water. Workability of the mix was followed according to ASTM C-143, a slump test that was performed on the mix at 10, 20, 30, 45 and 60 minute intervals from the time the mix water was added to the dry ingredients. Air content was determined according to ASTM C-231. Compressive strength tests were conducted on three inch diameter concrete cylinders of six inches in length, molded from samples taken between the 20–30 minute slump measurements. ASTM C-873 standards were followed for compressive strength tests.

EXAMPLE 1

The Portland cement mix described above without any additive was compared to the same mixes containing a commercially available superplasticizer (a naphthalenesulfonic acid-formaldehyde condensation product), the styrene-α-methylstyrene sulfonate (SAMS) alone and in combination with potassium gluconate. The SAMS product employed herein was a sulfonated copolymer having a styrene to α-methylstyrene mole ratio of 60/40, an initial molecular weight of 11,000 and a degree of sulfonation of 1.2. Table I summarizes the composition and properties of these mixes. Sample (A), the control, contains 294 ppm air-entraining agent based on cement while Sample (B), contains the commercial superplasticizer mix, with 441 ppm air-entraining agent. Sample (C) contains the SAMS product and 300 ppm of Dow Corning Antifoam 1520 to control air content. Sample (D), representative of the invention, contains the SAMS product, the potassium gluconate and 300 ppm DC 1520 antifoam. All ingredients in Table I are in parts dry weight.

TABLE I

| | SAMPLE | | | |
|---|---|---|---|---|
| | A (Control) | B (Commercl.)* | C (SAMS + antifoam) | D (SAMS + antifoam + gluconate) |
| Portland cement (Type I) | 30 | 30 | 30 | 30 |
| Sand (2 NS) | 80 | 80 | 80 | 80 |
| Gravel - four cuts | 80 | 80 | 80 | 80 |
| Total water | 16 | 12.8 | 12.8 | 12.8 |
| Superplasticizer | 0 | 0.115 | 0.097 | 0.075 |
| Potassium Gluconate | — | — | — | 0.011 |
| Air content, percent | 6.0 | 4.2 | 3.0 | 3.0 |
| Water/cement | 0.53 | 0.43 | 0.43 | 0.43 |
| Superplasticizer/cement (percent) | 0 | 0.38 | 0.32 | 0.25 |
| Gluconate/cement (percent) | — | — | — | 0.0367 |
| Initial slump, inches @ 10 minutes | 7.0 | 7.0 | 7.25 | 7.5 |
| 30 minute slump, inches | 6.25 | 3.0 | 4.25 | 4.5 |
| 45 minute slump, inches | 5.75 | 2.25 | 2.5 | 3.75 |
| 60 minute slump, inches | 5.5 | <2 | <2 | 2.75 |

*Naphthalene sulfonic acid-formaldehyde condensate

The data in Table I shows that while SAMS is more efficient than a commercial superplasticizer in imparting flow properties to a hydraulic cement mix, the combination of a gluconate and SAMS gives an unexpectedly better result. The addition of potassium gluconate also retards loss of slump at 45 minutes and beyond compared to SAMS alone, which itself is slightly better than the commercial material. The compressive strength results are presented in Table II.

TABLE II

| | SAMPLE | | | |
|---|---|---|---|---|
| | A (Control) | B (Commercl.) | C (SAMS + antifoam) | D (SAMS + antifoam + gluconate) |
| Compressive Strength After | | | | |
| 1 day (psi) | 1712 | 3661 | 3178 | 3367 |
| 3 days (psi) | 3183 | 5909 | 5715 | 5932 |
| 7 days (psi) | 4322 | 6773 | 6685 | 6880 |
| 14 days (psi) | 4923 | 7240 | 7300 | 7540 |

Table II demonstrates the increased strength that cement mixes containing superplasticizers, Samples B, C, and D, possess as a result of the lesser amount of water in the mix. SAMS alone, Sample (C), does not achieve the same early compressive strength as the commercial superplasticizer, Sample (B), but the addition of small amounts of potassium gluconate salt, Sample (D), improves early strength of SAMS-containing mixes such that it surpasses the commercial product after 3 days. The SAMS alone required 14 days to surpass the commercial superplasticizer.

EXAMPLE 2

This example compares higher slump concrete mixes to a control containing no additives. The same type and amount of cement, sand, and gravel were used as in Example 1. Sample (E), the control, contained 147 ppm air-entraining agent. Sample (F) contained a commercially available naphthalene-formaldehyde sulfonate (Daracem 100, a product sold by W. R. Grace), and 394 ppm air-entraining agent. Sample (G) contained the SAMS product and gluconate employed in Example 1(D) above and 300 ppm Dow Corning Antifoam 1520. Air content, slump loss, and compressive strength results are tabulated in Table III.

TABLE III

| | SAMPLE | | |
|---|---|---|---|
| | E (Air Entrng.) | F (Commercl. Plasticizer + Air Entrng.) | G (SAMS + Antifoam + Gluconate) |
| Water/cement | 0.53 | 0.43 | 0.43 |
| Superplasticizer/cement (percent) | — | 0.65 | 0.39 |
| Air content | 4.0 | 7.5 | 3.0 |
| Gluconate/cement (percent) | — | — | 0.0367 |
| Slump, inches @ | | | |
| 10 minutes | 7.0 | 8.75 | 9.0 |
| 30 minutes | 5.75 | 6.5 | 9.0 |
| 60 minutes | 4.0 | 4.5 | 7.5 |
| 90 minutes | 3.0 | 2.75 | 4.0 |

TABLE IV

| | SAMPLE | | |
|---|---|---|---|
| | E (Air Entrng.) | F (Commercl. Plasticizer + Air Entrng.) | G (SAMS + Antifoam + Gluconate) |
| Compressive Strength After | | | |
| 1 day (psi) | 1716 | 2942 | 3088 |
| 3 days (psi) | 2985 | 5215 | 5243 |
| 7 days (psi) | 3866 | 5544 | 5983 |
| 28 days (psi) | 5412 | 6563 | 7096 |

Table III shows that high slump concrete superplasticized with either naphthalene-based dispersants or the SAMS-gluconate system can retain better flow properties with time than a control up to about an hour, but the naphthalene-formaldehyde sulfonate then becomes stiffer than the control (Sample E) while the SAMS-gluconate mix, Sample (G), has workability at 90 minutes equivalent to the workability of the control at 60 minutes. The efficacy of Sample (G) is 34% greater than the commercial product, Sample (F), based on percent content to produce the same workability. As previously demonstrated in Example 1 (Table II), the compressive strength of the SAMS/gluconate mix surpasses that of the Daracem 100 mix after about 3 days of cure. This is shown for Samples E, F, and G in Table IV.

The compositions of gluconate and SAMS described in the present invention are unexpectedly better in enhancing water reducing effects, extention of workability, and strengthening effects than the condensation products of naphthalene sulfonic acid-formaldehyde materials.

The compositions of the invention are improved when an antifoam agent is also added to the concrete mix. Amounts of from about 0.01 to about 0.15 percent antifoam agent based on dry weight of cement are generally employed, the preferred amount being in the range of from about 0.005 to about 0.10 percent.

I claim:

1. An improved superplasticizer composition for use in hydraulic cement mixtures comprising a sulfonated copolymer of styrene and alpha-methylstyrene or a salt thereof, wherein the mol ratio of styrene to alpha-methylstyrene is from 30:70 to 70:30 and the weight average molecular weight is from about 5,000 to 20,000, together with from about 5 to about 20% of a salt of gluconic acid and from about 7.5 to about 20% of an antifoam agent, both being based on the weight of the copolymer.

2. The composition of claim 1 wherein the degree of sulfonation of the copolymer is from about 0.5 to about 2.0 and the salt is an ammonium, alkali metal or alkaline earth metal salt of the sulfonated copolymer.

3. A composition of claim 2 wherein the salt of gluconic acid is an alkali metal salt.

4. A composition of claim 3 wherein the alkali metal salt is the sodium, lithium, or potassium salt.

5. A composition of claim 2 wherein the salt of gluconic acid is an alkaline earth metal salt.

6. A composition of claim 5 wherein the alkaline earth metal is magnesium or calcium.

7. The composition of claim 1 wherein the salt of gluconic acid and the antifoam agent are present in amounts of from about 10 to about 20% and from about 5 to about 10%, respectively.

8. The composition of claim 7 wherein the salt of gluconic acid is an alkali metal salt.

9. The composition of claim 8 wherein the alkali metal salt is the sodium, lithium, or potassium salt.

10. The composition of claim 7 wherein the salt of gluconic acid is an alkaline earth metal salt.

11. The composition of claim 10 wherein the alkaline earth metal is magnesium or calcium.

12. The composition of claim 7 wherein the degree of sulfonation of the copolymer is from about 1.0 to about 1.5 and the salt is an amine, ammonium, alkali metal or alkaline earth metal salt of the sulfonated copolymer.

13. The composition of claim 12 wherein the alkali metal is lithium, sodium or potassium.

14. The composition of claim 12 wherein the alkaline earth metal is magnesium or calcium.

15. The composition of claim 12 wherein the amine salt is derived from aminoethylpiperazine, diethylamine, triethylamine, n-butylamine, ethylenediamine, diethylenetriamine, triethylenetetramine or tetraethylenepentamine.

* * * * *